United States Patent [19]

Hazel

[11] 3,734,386

[45] May 22, 1973

[54] WIRING APPARATUS WITH WIRE PATH FORMING MEANS

[75] Inventor: Herbert K. Hazel, Poughkeepsie, N.Y.

[73] Assignee: International Business Machines Corporation, Armonk, N.Y.

[22] Filed: June 30, 1971

[21] Appl. No.: 158,344

[52] U.S. Cl. ........................228/5, 29/470.1, 29/589, 29/592, 219/78, 228/1

[51] Int. Cl. ..............................................B23k 1/20

[58] Field of Search..........................228/1, 3, 4, 5, 6; 219/78, 80, 85; 156/73; 29/470.1, 592, 628, 589

[56] References Cited

UNITED STATES PATENTS

| | | | |
|---|---|---|---|
| 2,994,244 | 8/1961 | Hay | 219/78 X |
| 3,103,137 | 9/1963 | Charschan | 78/82 |
| 3,244,344 | 4/1966 | Folk | 228/13 |
| 3,307,763 | 3/1967 | Rasimenoks | 228/3 |
| 3,459,355 | 8/1969 | Metyger, Jr. | 228/1 |
| 3,646,307 | 2/1972 | Hazel | 228/1 X |

*Primary Examiner*—J. Spencer Overholser
*Assistant Examiner*—Robert J. Craig
*Attorney*—Hanifin and Jancin and William S. Robertson

[57] ABSTRACT

Improved apparatus for bonding a wire between two conductive pads on a circuit module is disclosed. Means is provided for bending the wire to conform to a predetermined path from the first bonding site to the second. The bends are unsupported and the wire feed is arranged to supply additional wire to the module without disturbing a previously formed bend.

6 Claims, 19 Drawing Figures

INVENTOR
HERBERT K. HAZEL

BY W.S. Robertson

ATTORNEY

WIRING APPARATUS WITH WIRE PATH FORMING MEANS

RELATED APPLICATIONS

Application Ser. No. 75,033 now U.S. Pat. No. 3,646,307, of H. K. Hazel for "Wiring Apparatus," filed Sept. 24, 1970, and assigned to the assignee of this invention, discloses an improved apparatus for bonding wires between pairs of bonding points on a circuit module or other subject to be wired. Some of the apparatus used in this invention is described in detail in the cited Hazel application, and the application provides a helpful background to the objects and features of this invention.

Application Ser. No. 90,929 now U.S. Pat. No. 3,691,864, of T. J. Cochran, H. K. Hazel and W. G. Rance, for "X-Y, Rotational Positioning System," filed Nov. 19, 1970, and assigned to the assignee of this invention, discloses a positioning apparatus that is used with the wiring apparatus of this invention.

THE INVENTION

In contrast to the apparatus of the cited Hazel application which positions a wire in a direct line from the first bond site to the second, the apparatus of this invention is intended to form bends in the wire that may be required to position the wire along row and column pathways on a circuit module. The apparatus is particularly useful for wiring a module that has component mounting locations arranged in a matrix with row and column wire pathways between the component locations and wire bonding sites along the periphery of the component mounting locations bordering the pathways for the wires. Preferably, these wires are very small and when one or more bends have been formed in a wire, it is difficult to feed out additional wire or to form additional bends without disturbing the portion of the wire already formed.

The preferred apparatus has a wire feed that includes two carriages that are movable independently toward and away from a reference point where bonding and wire bending are to take place. The carriage that is rearmost from the bonding site carries a spool of wire. The forward carriage has a wire feed tube that is positionable to locate the wire in the region of the bonding site. Means is provided for clamping the wire at the rear carriage and for moving both the rear carriage and the module to push out a length of wire over the module. This operation prevents the next wire feeding operation from disturbing the previously positioned portion of the wire.

For forming 90° bends in the wire, wire dressing tools are provided that engage the wire as the module is rotated. Two dressing tools are located near the wire feed tube on either side of the line formed by a wire fed from the wire feed tube. The dressing tool to the outside of the bend can be lowered to engage the module and can flex so as to swing in a quarter circle about the feed tube as the module is turned with respect to the wire feed tube. The dressing tool and the feed tube thus cooperate to bend the wire.

Because the wire is fed onto the module without disturbing the previously formed part of the wire, the wire dressing tools can be raised after a bending operation and the apparatus does not require further support for the wire at the bend.

The apparatus is adapted to form bends after the module has been wired and then supplied with components that would interfere with the operation of the apparatus described so far. The wire feeding apparatus can be elevated to 90° with respect to the wire receiving surface of the module so that only the feed tube is near the module while the module is rotated to form a bend. With the feed tube in this position, turning the module as described so far would only twist the wire and would not produce a discrete bend. The apparatus includes means for twisting the wire during this operation. The combined steps of twisting the wire, rotating the module, and pivoting the wire feed tube produce a bend at the desired location in the wire.

The description of the preferred embodiment of the invention will point out other objects, advantages and features of this invention.

THE DRAWING

THE WIRING APPARATUS OF THE DRAWING

INTRODUCTION

Figure 1:
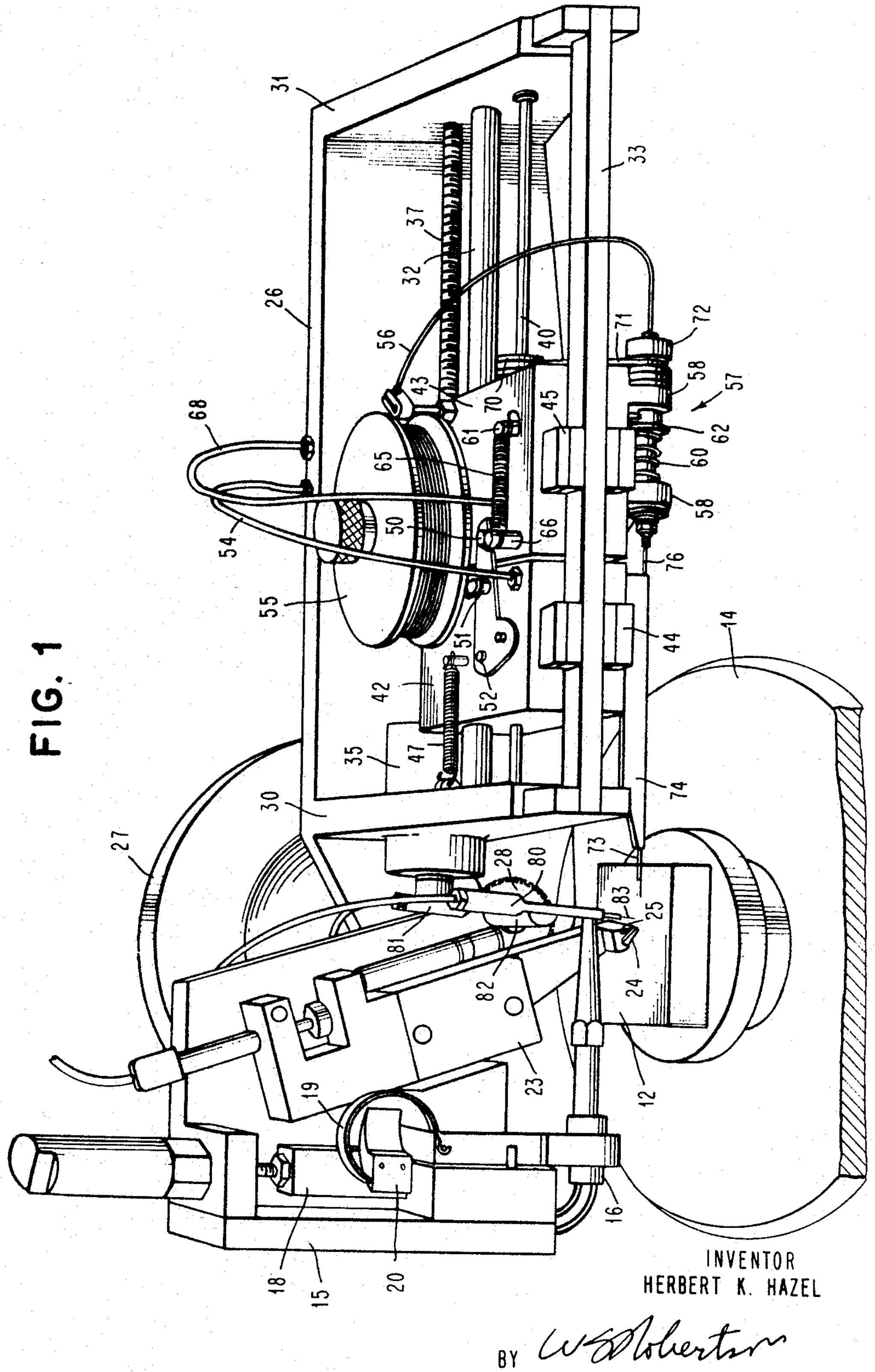
FIG. 1 is an isometric of the preferred wiring apparatus of this invention.

FIG. 1 shows a circuit module 12 or other subject to be wired that has component mounting locations in an array that provides rows and columns along which wires can be positioned between the components. The upper surface of module 12 has conductive pads (not shown) that are interconnected within the module. The apparatus of this invention positions wires in predetermined patterns along the row and column paths. Module 12 is mounted on a positioning apparatus 14 that is described in the cited Cochran et al. application. The positioning apparatus moves module 12 in the X and Y horizontal dimensions, raises and lowers the module, and rotates it about a fixed vertical axis.

The general organization of the apparatus of FIG. 1 can be understood by first considering the components that are functionally or structurally similar to components of the cited Hazel application. A stationary base 15 supports the other components. An ultrasonic bonder 16 is mounted on base 15 with the axis of the bonding tip (17, hidden in FIG. 1) aligned with the axis of rotation of positioning apparatus 14. Bonder 16 is moved vertically by means of an air cylinder 18 supplied through a tube 18 for raising and lowering the bonder tip. A bourdon tube 19 which receives air pressure through a tube 20 applies pressure required for the bonding operation. A wire receiving clamp 23 is movably mounted on base 15 and has a movable jaw 24 and a fixed jaw 25 for clamping the free end of a wire while the first bond is being made. Clamp 23 is movable diagonally upward and to the left for breaking loose the scrap at the free end of the wire after the first bond has been made.

THE WIRE FEEDING APPARATUS

Figure 4:
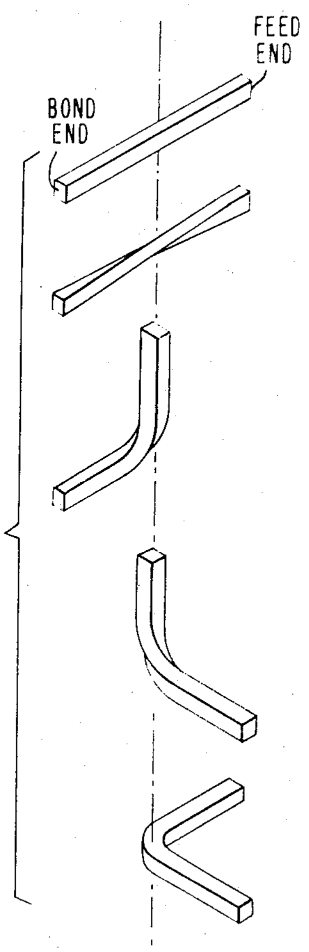
FIG. 4 shows a wire bending and twisting operation with the apparatus of FIG. 3.

FIG. 1 also shows the general features of the wire feeding apparatus which is shown in further detail in FIGS. 2, 3 and 4. A supporting arm 26 is mounted to pivot on a horizontal axis that intersects the axis of rotation of positioner 14. A drive mechanism 27 pivots arm 26 and independently drives a gear 28. Arm 26 has a front extension 30 and a rear extension 31 that support two carriage guides 32, 33. Extension 31 and a bearing mechanism 35 support a carriage drive screw 37. A gear (hidden in FIG. 1) connects screw 37 to be driven from gear 28 of drive mechanism 27. Extensions 30, 31 also support a rotatable splined shaft 40 that is rotated by an electric motor (not shown in the drawing) that is mounted on arm 26.

The wire feed apparatus also includes a forward carriage 42 and a rear carriage 43. The carriages have bearings 44, 45 for riding on carriage guide 33 and they have a bore (hidden in FIG. 1) for riding on carriage guide 32. Rear carriage 43 is threaded (see FIG. 4) to be driven by carriage drive screw 37. Forward carriage 42 does not directly engage drive screw 37. A spring 47 urges forward carriage 42 to its forward most position. A latch mechanism 49 – 54 selectively latches forward carriage 42 to be moved along guides 32, 33 by rear carriage 43. The latch 49, latch post 50, a spring post 51, a pivot 52 for latch 49, an operating device 53, and a supply tube 54 for an air operated piston can be seen in FIG. 1; other components of the latch will be described later.

A wire holding spool 55 is rotatably mounted on rear carriage 43 and wire is lead through a wire guide tube 56 to a rotatable wire clamp 57. The simplified drawing of the wire clamp 57 in FIG. 1 shows two supports 58 that are mounted on rear carriage 43 and support the rotatable wire transmitting element 59 of the clamp, a spring 60 that sets the wire clamp, and a lever 61 that pivots against a collar 62 to compress spring 60 and release the wire clamp. Lever 61 is held in its position away from collar 62 to release spring 60 by means of a spring 65 that is attached between the upper end of lever 61 and a post 66 that is mounted on the upper surface of rear carriage 43. An air operated cylinder that is mounted in carriage 43 and shown in detail in FIG. 4 receives actuating air through a line 68. Operating the piston pivots lever 61 clockwise and compresses spring 60 to release the wire clamp.

A pully 70 is mounted on rear carriage 43 to be driven from splined shaft 40. A belt 71 connects pully 70 to turn a pully 72 that is mounted to turn wire clamp 57. Turning splined shaft 40 turns the wire clamp for a wire untwisting or pretorqueing operation that will be described later.

A wire feed tube 73 is mounted on forward carriage 42 by means of a support 74. Wire feed tube 73 and the wire receiving bore of wire clamp 57 are positioned on a radius of the axis of pivoting of arm 26 and in line with the axis of bonding tip 17 and the axis of rotation of positioning apparatus 14. In addition, the tip of the wire feed tube is positioned at this point when the forward carriage is in its forward most position. Preferably, a rear feed tube wire 76 is mounted on the rotatable element 59 to extend forward through feed tube 73 and to be just short of the left most end of tube 73 when carriages 42, 43 are in the latched position of FIG. 1. Tube 76 further supports the wire during the wire feeding operation.

THE WIRE DRESSING TOOLS

FIG. 1 also shows two wire dressing tools that have housings 80, 81 mounted on a shaft 82 and positioned on either side of bonding tip 17. The tools each comprise a wire 83 (and 84, hidden in FIG. 1) that extends from the lower end of the housing. Each housing includes an air operated cylinder for selectively lowering either or both of the tools 83, 84 to contact the module 12 or for raising the tools to clear the region of a bonding operation. Between the lower ends shown in FIG. 1, and the air operated cylinders, the tools include springs that prevent the force on the tools from damaging the module. Shaft 82 is mounted on base 15 and is rotatable to swing the dressing tools through the region where a bond is to be made for clearing the region of previously positioned wires, as will be explained in the description of FIG. 2.

OPERATION - FIG. 2

FIG. 2 shows a succession of steps in bonding the first end of a wire at a first bonding site, forming a right angle bend in the wire, and bonding the second end of the wire at the second bonding site. FIG. 2J shows a top view of the module at nearly the completion of this operation. A vertical line throughout FIG. 2 represents the axis of rotation of positioning apparatus 14. FIG. 2A shows the forward carriage in its forward most position where the tip of the wire feed tube 73 is at a reference point defined by the axis of rotation of positioning apparatus 14 and the axis of the drive 27 for pivoting the wire feed arm 26. As the operation proceeds, the module and the weld tip are raised and lowered with respect to this point and the wire feed tube 73 and wire clamp 57 are pivoted and moved radially with respect to this point.

Figure 2A:
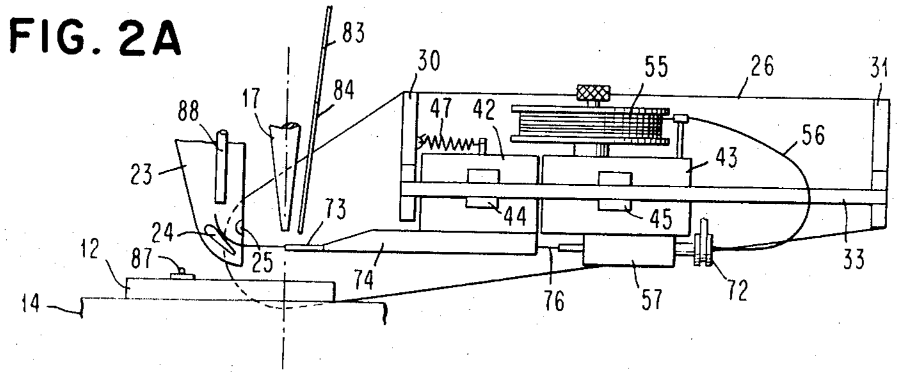
FIGS. 2A–2L shows the apparatus of FIG. 1 in a sequence of steps of a wiring operation.
Figure 3A:
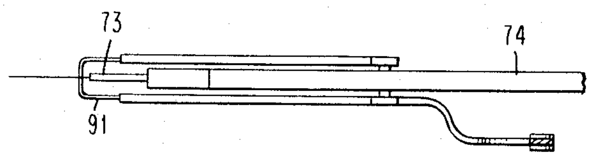
FIG. 3 shows further components of the apparatus in a sequence of steps for a modified wiring operation.
Figures 3B, 3C:
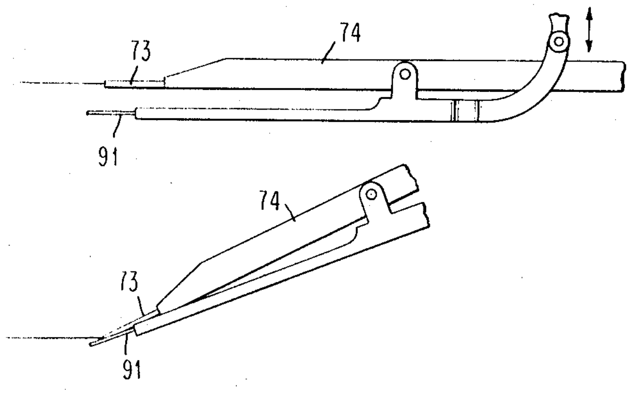

FIG. 2A shows the operation of feeding the first end of the wire into wire clamp 23 to make the first bond. Clamp 23 is lowered and movable jaw 24 is pivoted downward to receive the first end of the wire. The support arm 26 is lowered to its horizontal position, and the two carriages 42, 43 are latched together and driven forward to push the end of the wire into clamp 23. During this operation, the bonding tip remains upwardly retracted and the module 12 is independently moved from the site of a previous bond to the site of the next bond that is to be made.

Figure 2B:
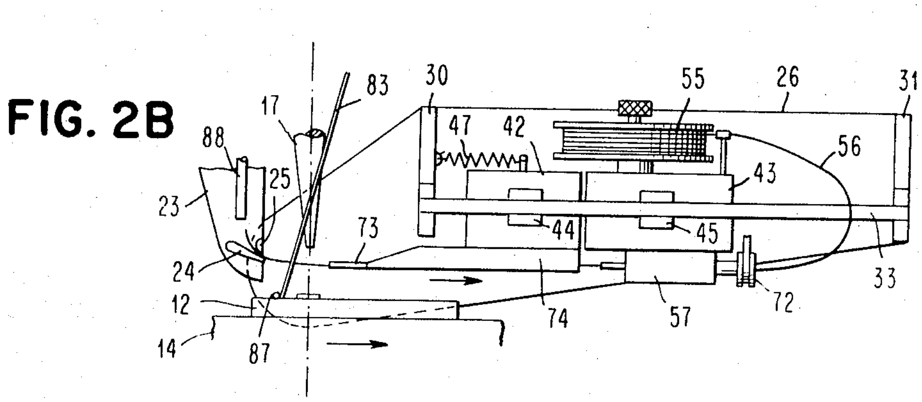

In the operation of FIG. 2B, the first end of the wire is clamped between jaws 24, 25 and the wire clamp 57 is released and carriages 42, 43 are driven rearwardly to clear the region where the bonding operation is to take place. The weld tip 17 is lowered to catch the length of wire between clamp 23 and wire feed tube 73. As the module is raised to engage the bonding tip at the reference point, the wire dressing tools 83, 84 are lowered and pivoted to sweep the bonding site clear of any wires 87 that have been positioned over the bonding site during a previous wiring operation.

Figure 2C:
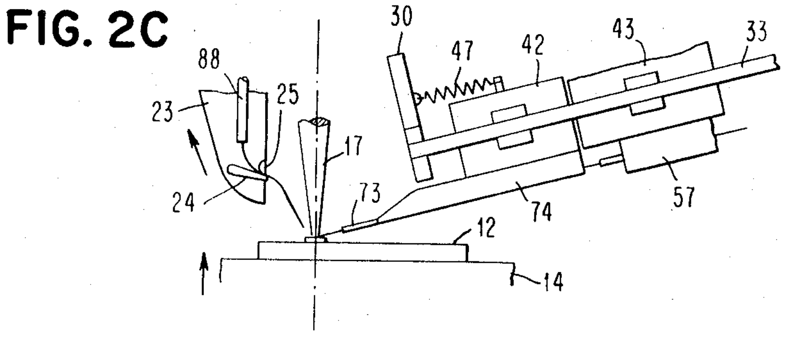

As the module is raised from the position of FIG. 2B to the position of FIG. 2C, arm 26 is pivoted slightly to an angle of about 10° to avoid hitting the wires or other components mounted on the module. When the module, the bonding tip, and arm 26 are in the position of FIG. 2C, the bond is formed. Then, as FIG. 2C shows, clamp 23 is moved to break the scrap end of the wire from the bond. A suction tube 88 is provided for removing the scrap.

Figure 2D:
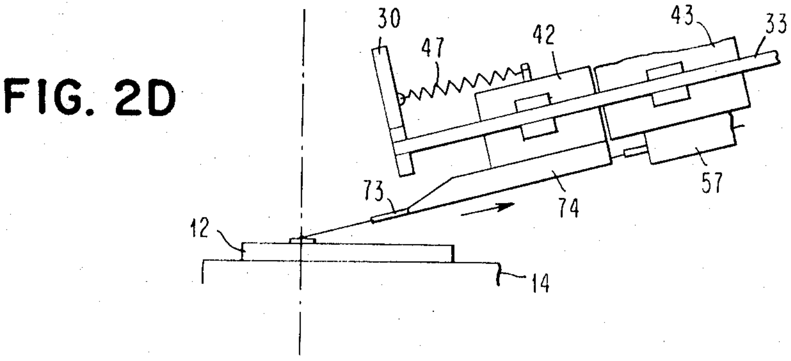

With wire clamp 57 set, the rear carriage is backed sufficiently to test the bond as FIG. 2D shows. Then, the wire clamp is released and the carriages are backed to place a programmed length of wire between the bond and wire clamp 57. Since many of the wires are to be only a fraction of the full length of travel of carriage 43, it is advantageous to move the carriage only the distance actually required for a particular wiring operation; furthermore, the operations of moving the carriage rearwardly a programmed distance and in later steps advancing the carriage the same programmed distance provides a check that the intervening steps have in fact been carried out. From a more general standpoint, carriage 43 and preferably carriage 42, are moved rearwardly at least the distance required for the subsequent steps.

Figure 2E:
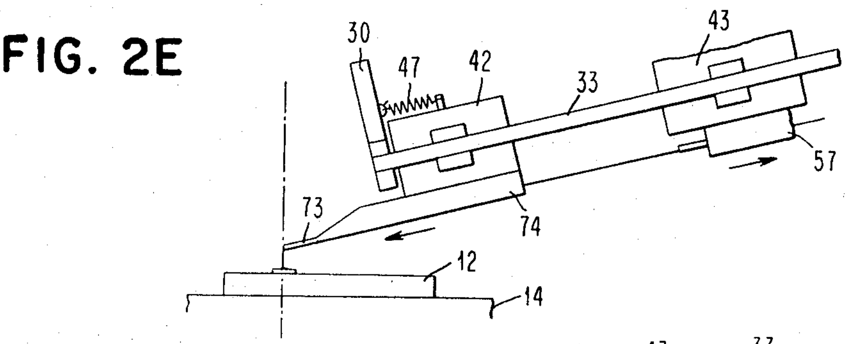

FIG. 2E shows the step of forming a short vertical length of wire at the first bond. The module is lowered by the programmed amount and the rear carriage 43 is simultaneously moved forward the same amount. The carriages are then unlatched and the forward carriage 42 is moved forward to its reference position to form a bend in the wire. With this operation, the wire is at a preselected height for being positioned over any wires previously bonded to the module.

Figure 2F:
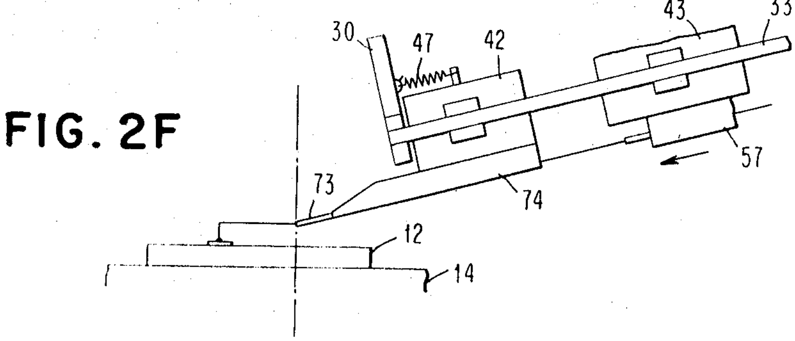
Figure 2G:
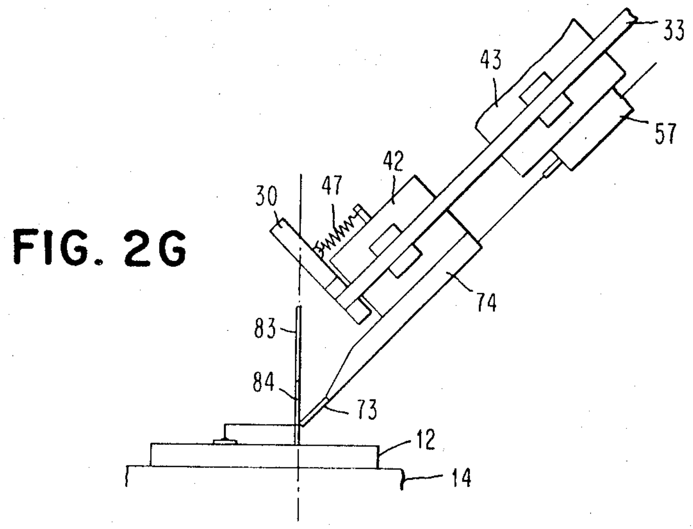
Figure 2H:
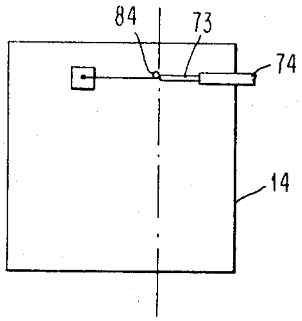
Figure 2I:
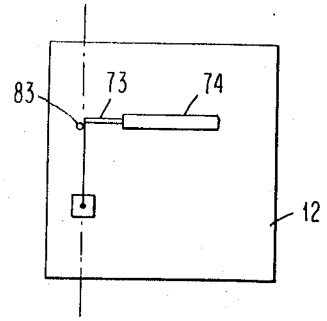
Figure 2J:
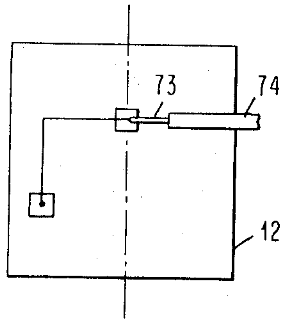

FIGS. 2G, H, and I show the operation of forming a bend when a wire is being bonded to a module that does not yet have components mounted. The supporting arm 26 is pivoted to a relatively low angle that is appropriate for clearing any previously bonded wires that might otherwise hit the wire feeding apparatus when the module is rotated to form a bend. The dressing tool 83 or 84 on the outside of the turn is lowered to engage the module, as FIG. 2G shows. As the module is rotated from the position of FIG. 2G and H to the position of FIG. 2I, the forming tool 84 flexes at the lower end of its housing 81 to swing in a quarter circle and bend the wire. This feature of the apparatus is particularly advantageous when a previous bend has been formed in a wire because the turning operation might otherwise only displace the wire from its intended position on the module. Preferably, the module is turned somewhat beyond the position of the desired bend and then returned to the position of FIG. 2I to assure that the wire holds the desired bend after the bending operation. The wire dressing tool is then raised and the module and the rear carriage are again moved to the left to the position of the second bond, as FIG. 2J shows.

Figure 2K:
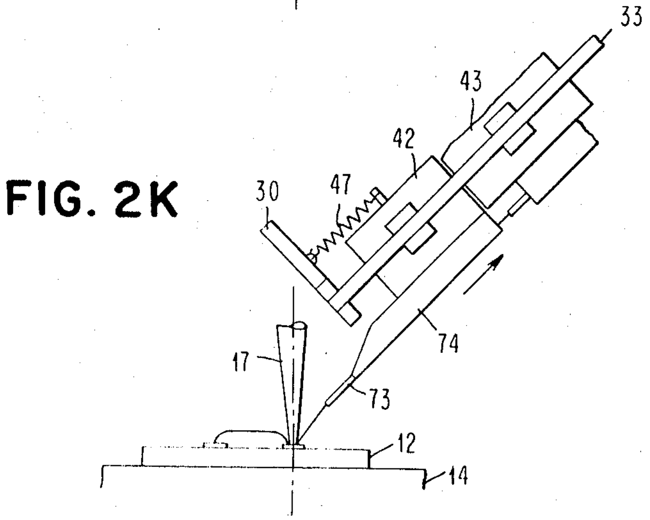
Figure 2L:
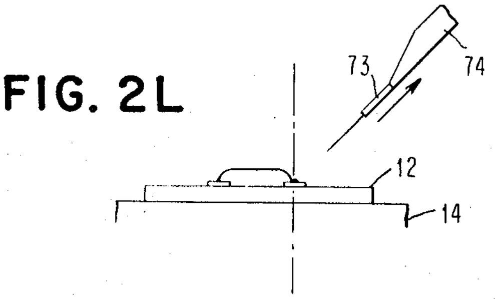

At the location of the final bond, the wire feed tube is backed sufficiently to make room for the bonder tip 17, as shown in FIG. 2K. The wire feed tube is backed to provide enough wire for the operation of FIG. 2A of clamping the end of the wire in clamp 23. The wire clamp on carriage 43 is then set and the carriage is backed to break the wire at the second bond as shown in FIG. 2L.

During several of the operations just described, the wire is led from the spool 55. Preferably, a suitable wire motion sensor (not shown) is provided to signal that the wire is being fed from spool 55 and this signal is sampled at times when the program indicates that carriage 43 is to be moved with the wire clamp set. This apparatus signals a break in the wire or similar fault.

OPERATION - FIGS. 3 AND 4

FIG. 3 shows a modified operation and additional details of the apparatus for wiring a module on which components have been mounted that would hit the wire feeding apparatus as the module is rotated while the support arm 26 is in the relatively low angle of FIG. 2F. This modification is useful for changing the wiring of a module that was first wired in the method of FIG. 2 and then supplied with components that are significantly higher than the wiring layers. To clear these components, the support arm 26 is raised to 90° or an otherwise suitable angle.

In this operation, the wire dressing tools 83, 84 are not used. A dressing tool 91 (shown in the top view of FIG. 3A and the side view of FIG. 3B) is pivotably mounted on wire feed tube support 74 and is operated by an air cylinder (not shown) to sweep under the tip of the wire feed tube in the sequence shown in FIGS. 3B, C and D as the support arm 26 is pivoted to about 90° to prepare for a wire bending operation. During this sequence, the module and apparatus is in the position seen in the top view of FIG. 2G except that the wire dressing tools 83, 84 are retracted.

Figure 3D:
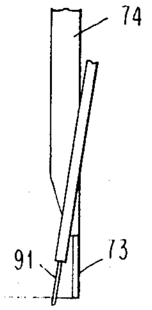

During the operation illustrated in FIG. 3, the wire clamp is rotated in such a way that the bend seen in the side view of FIG. 3D forms the flat bend seen in FIG. 2J. FIG. 4 shows a sequence of operations on a wire that is drawn with a square cross section to better indicate the twisting operation. The wire is twisted before the bend of FIG. 3. As the module is rotated, the wire clamp is turned to prevent further twisting. As the feed tube is pivoted downward, the wire is given a bent position that tends to hold the previously formed portions of the wire undisturbed. The operation of twisting the wire to compensate for rotation of the module is also useful in the operation of FIG. 2, although the rotation of the module produces a smaller twist when the feed tube is at a lower angle; the wire can be turned before, after or during the module rotation.

ADDITIONAL DETAILS - FIG. 5

Figure 5:
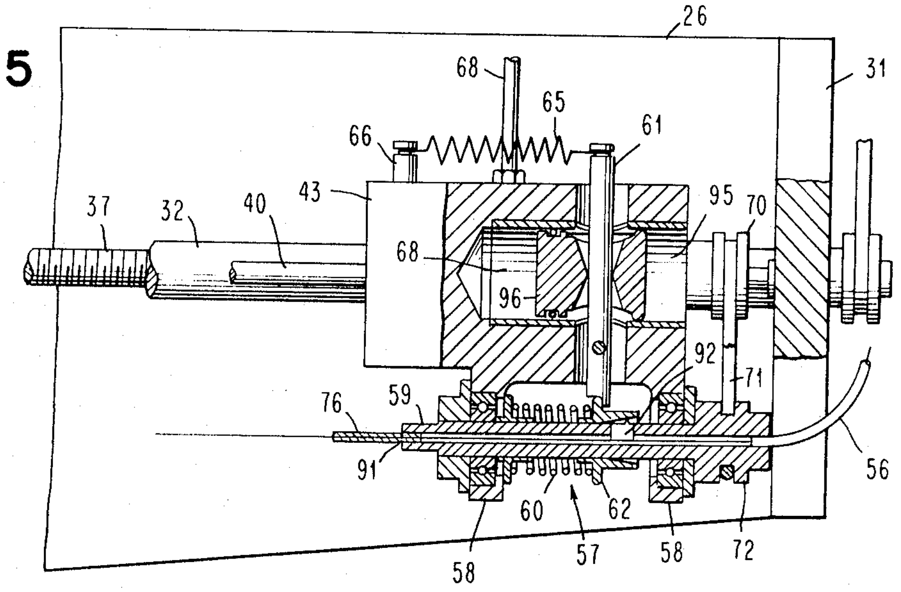
FIG. 5 shows further details of the apparatus of FIG. 1.

FIG. 5 shows details of the wire feed clamp 57 and the air piston that were introduced in the description of FIG. 1. The general relationship of FIG. 5 to FIG. 1 can be seen from the support arm 26, the forward extension 31, and the rear carriage 43. similarly, these components of the rotatable wire clamp 57 have been introduced in the description of FIG. 1: the two supports 58, the rotatable element 59, the spring 60 that sets the clamp, a lever 61, a collar 62 that transmits a force from lever 61 to compress spring 60, a spring mechanism 65, 66 that holds lever 61 normally disengaged from collar 62, and a tube 68 that supplies air to operate an air piston that pivots lever 61 to release the clamp.

The rotatable element 58 has an axial bore 91 through which the wire passes. An element 92 is located in a hole in element 58 to be pushed radially inward on the clamp by means of a caming surface of collar 62. Thus, spring 60 normally urges the collar to a position to set the clamp.

The air piston comprises a cylinder formed in the rear carriage and having a pressurizable portion 94 and a portion 95 that is open to atmospheric air pressure. A piston 96 is provided with a vertical opening that receives the lever 61. Thus, air pressure applied to tube 68 operates lever 61 to release the clamp and in the absence of air pressure, spring 65 returns lever 61 to its normal position and spring 60 operates collar 62 against element 92 to set the clamp. The air piston for the carriage latch is similar.

OTHER EMBODIMENTS

Those skilled in the art will recognize variations of the specific structures and operations that have been described and will find a wide range of applications for the apparatus of this invention and appropriate modifications within the scope of the claims.

What is claimed is:

1. In combination with a bonder for attaching a wire to a bonding site on a subject to be wired and a positioner for positioning the subject with respect to a reference point where the bonding operation is to take place, wire handling apparatus comprising:

a carriage, wire supply means mounted on said carriage, a wire clamp mounted on said carriage, and means supporting said carriage for movement with the wire in said wire clamp maintained in substantially straight alignment with said reference point, means for manipulating the wire only in the region of said reference point to bond a wire to the subject and for holding the wire at said reference point for a bending operation as the subject is rotated in a horizontal plane about an axis intersecting said reference point, means for pivoting said carriage supporting means about a horizontal axis intersecting said reference point for raising the apparatus to clear the subject during wire bending rotation of the subject and for maintaining components of said wire manipulating means in said region of the reference point; and means for moving said carriage on said supporting means in synchronism with movement of said subject to feed additional wire onto said subject without disturbing previously formed portions of the wire.

2. The apparatus of claim 1 in which said carriage is a rear carriage and said apparatus further comprises a carriage mounted forward of said rear carriage on said supporting means and said wire manipulating means includes a wire feed tube mounted on said forward carriage to support the wire at said reference point.

3. The apparatus of claim 2 further comprising a second feed tube mounted on said rear carriage and extending into said wire feed tube to support the wire between said first and second carriages.

4. In combination with a bonder for attaching a wire to a bonding site on a subject to be wired and a positioner for positioning the subject with respect to a reference point where the bonding operation is to take place, wire handling apparatus comprising, a forward carriage and a rear carriage, means supporting said carriages for linear movement, and means for pivoting said carriage supporting means about a horizontal axis intersecting said reference point for raising the apparatus to clear the subject during wire bending rotation of the subject, wire supply means mounted on said rear carriage, a first wire feed tube mounted on said forward carriage and a second wire feed tube mounted on said rear carriage for supporting said wire, and a wire clamp mounted on said rear carriage, means for moving said rear carriage toward said reference point in synchronism with movement of said subject with said wire clamp set to feed additional wire onto said subject without disturbing previously formed portions of the wire and means for moving said forward carriage independently of said rear carriage to a forward most position where said first wire feed tube supports the wire at said reference point for wire manipulating operations, and a pair of wire dressing tools mounted independently of said carriages in the region of said reference point on either side of the line formed by a wire fed from said wire feed tube to the subject to be wired, each dressing tool being extendable to engage the surface of the subject and flexible to pivot partially about said reference point as the subject is rotated for a bending operation for preventing the bending operation from disturbing previously formed portions of the wire.

5. The apparatus of claim 4 further comprising means for pivoting said wire dressing tools in a line parallel to the line formed by a wire fed from said wire feed tube for clearing a bonding site of any wires positioned over the bonding site from a previous wiring operation.

6. The apparatus of claim 4 further comprising means for rotating said wire clamp to compensate for the twist that would otherwise occur in the wire as the subject is rotated when the carriage support is raised at an angle with respect to the plane of the subject.

* * * * *